US011128249B2

(12) United States Patent
McLean et al.

(10) Patent No.: US 11,128,249 B2
(45) Date of Patent: Sep. 21, 2021

(54) SOLID STATE PHASE ISOLATION OF MULTI-PHASE MOTORS

(71) Applicant: Hamilton Sundstrand Corporation, Charlotte, NC (US)

(72) Inventors: Andrew McLean, Halesowen (GB); Parminder Singh Sangha, Solihull (GB)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 114 days.

(21) Appl. No.: 16/693,431

(22) Filed: Nov. 25, 2019

(65) Prior Publication Data

US 2021/0044239 A1 Feb. 11, 2021

(30) Foreign Application Priority Data

Aug. 5, 2019 (EP) .................................... 19275086

(51) Int. Cl.
| | |
|---|---|
| *H02P 25/22* | (2006.01) |
| *H02K 3/28* | (2006.01) |
| *H02K 29/08* | (2006.01) |
| *H02K 11/215* | (2016.01) |

(52) U.S. Cl.
CPC .............. *H02P 25/22* (2013.01); *H02K 3/28* (2013.01); *H02K 29/08* (2013.01); *H02K 11/215* (2016.01)

(58) Field of Classification Search
CPC ................................... H02P 25/22; H02K 3/28
USPC ........................................ 318/724, 720, 700
See application file for complete search history.

(56) References Cited

U.S. PATENT DOCUMENTS

| | | | |
|---|---|---|---|
| 6,909,258 B2 * | 6/2005 | Milazzotto | ............ H02M 5/293 318/800 |
| 9,257,930 B2 | 2/2016 | Suzuki | |
| 10,320,254 B2 | 6/2019 | Nakano et al. | |
| 2011/0316466 A1 | 12/2011 | Uryu | |
| 2013/0009580 A1 | 1/2013 | De Wergifosse | |
| 2014/0077745 A1 | 3/2014 | Kinouchi et al. | |

FOREIGN PATENT DOCUMENTS

EP 3366548 A1 8/2018

OTHER PUBLICATIONS

The Extended European Search Report for Application No. 19275086. 7-1202; dated Nov. 5, 2019; Report Received Date: Nov. 8, 2019; 7 pages.

* cited by examiner

*Primary Examiner* — David Luo
(74) *Attorney, Agent, or Firm* — Cantor Colburn LLP

(57) ABSTRACT

A system for controlling an electrical current flowing between a power source and a multi-phase electromagnetic machine includes a first lane, A, comprising a first plurality of phases capable of providing said current from said power source to said machine, and further comprises a second lane, B, comprising a second plurality of phases capable of providing said current to said machine. The system is configured to provide said current via said first lane, A, while no current is being provided via said second lane, B. Each of said first plurality of phases comprises at least one inverter switch positioned between said power source and said machine. The system further includes means for detecting a fault in one of the first plurality of inverter switches of lane A, and further comprises a first phase isolation means provided on said first lane, A.

15 Claims, 9 Drawing Sheets

SOLID STATE PHASE ISOLATION OF MULTI-PHASE MOTORS

FOREIGN PRIORITY

This application claims priority to European Patent Application No. 19275086.7 filed Aug. 5, 2019, the entire contents of which is incorporated herein by reference.

TECHNICAL FIELD

The present disclosure relates to the field of Multi-Phase motors having dual lane or multi-lane architectures and systems for dealing with a fault in one of those lanes.

BACKGROUND

Fault tolerant systems such as Electro-Mechanical systems that are used with dual-wound permanent magnet machines have been known to employ dual lane circuitry architectures. In known systems, when an inverter in one lane experiences a failure, the healthy lane can experience significant drag torque. Consequently, in known motors, the motor and inverter of both lanes are usually dimensioned in such a way that they are able to handle both the load torque on the healthy lane in addition to the drag torque on the unhealthy lane that has failed. Having to dimension the motor and inverters to deal with this increase in drag torque results in a cost, weight and size penalty of the overall system. The examples described herein therefore aim to provide a system for dealing with faults in electro mechanical systems that offer a reduced cost, weight and size in comparison to known systems.

U.S. Pat. No. 9,257,930B2 describes a controller for a multi-phase rotating machine. The controller includes power converters for supplying an alternating current to winding sets of a rotating machine. The controller includes a failure detector for detecting a failure which causes a braking current in the rotating machine. When the failure detector detects the failure, the control section stops the power converter in the failed system and sets the current in the normal system in such a way that the electric current in the failed system is reduced.

SUMMARY

A system for controlling an electrical current flowing between a power source and a multi-phase electromagnetic machine is described herein wherein the system comprises a first lane, A, comprising a first plurality of phases capable of providing the current from the power source to the machine, and further comprising a second lane, B, comprising a second plurality of phases capable of providing the current to the machine. The system is configured to provide the current via the first lane, A, while no current is being provided via the second lane, B. Each of the first plurality of phases comprises at least one inverter switch positioned between the power source and the machine.

In any of the examples described herein, the system may further comprise means for detecting a fault in one of the first plurality of inverter switches of lane A. The system may further comprise a first phase isolation means provided on the first lane, A, and upon the detection of the fault in lane A, the system may be configured to disable the inverter switches of lane A, and the first phase isolation means is configured to then block the current from flowing back from the machine and towards the faulty inverter of lane A.

In any of the examples described herein, the first and second lanes, A, B, may be electrically isolated from each other.

In any of the examples described herein, the first phase isolation means may be positioned between the first plurality of inverters and the machine.

In any of the examples described herein, each of the second plurality of phases of lane B may comprise at least one inverter switch positioned between the power source and the machine.

In any of the examples described herein, the system may further comprise a second phase isolation means provided on the second lane, B, the second phase isolation means being positioned between the second plurality of inverters and the machine.

In any of the examples described herein, after the current is blocked by the first phase isolation means, the system may be configured to enable the plurality of inverter switches provided on lane B so that the current flows from the power source to the machine via lane B and not via lane A.

In any of the examples described herein, the first phase isolation means may be configured to block the current when the current magnitude is less than a predetermined threshold.

In any of the examples described herein, the threshold may be more positive than −20 A.

In any of the examples described herein, the first phase isolation means may comprise a semiconductor switch and an associated diode.

A method for controlling the flow of an electrical current between a power source and a multi-phase electromagnetic machine is also described herein. The method comprises providing a first lane, A, having a first plurality of phases and being capable of providing the current from the power source to the machine. The method further comprises providing at least one inverter switch positioned on each of the first plurality of phases and between the power source and the machine. The method further comprises providing a second lane, B, comprising a second plurality of phases and being capable of providing the current to the machine. The method further comprises providing the current from the power source to the machine via the first lane A, while not providing a current is being provided via the second lane, B, and providing a first phase isolation means on the first lane, A.

In any of the examples described herein, the method may further comprise detecting a fault in one of the first plurality of inverter switches of lane A, and, upon the detection of the fault in lane A, disabling the inverter switches of lane A, and, via the phase isolation means, blocking the current from flowing back from the machine and towards the faulty inverter switch of lane A.

In any of the examples described herein, the method may further comprise electrically isolating the first and second lanes, A, B, from each other.

In any of the examples described herein, the method may further comprise positioning the first phase isolation means between the first plurality of inverters and the machine.

In any of the examples described herein, the method may further comprise positioning a second plurality of inverter switches on each of the second plurality of phases by positioning at least one inverter switch between the power source and the machine on each of the second plurality of phases of lane B.

In any of the examples described herein, the method may further comprise providing a second phase isolation means on the second lane, B, by positioning second phase isolation means between the second plurality of inverters and the machine.

In any of the examples described herein, the method may further comprise, after the step of blocking the current via the first phase isolation means, enabling the second plurality of inverter switches provided on lane B so that the current flows from the power source to the machine via lane B and not via lane A.

In any of the examples described herein, the step of blocking the current may be performed when the current magnitude is less than a predetermined threshold.

In any of the examples described herein, the threshold may be more positive than −20 A.

BRIEF DESCRIPTION OF THE FIGURES

Certain embodiments of the present disclosure will now be described in greater detail by way of example only and with reference to the accompanying drawings in which.

DETAILED DESCRIPTION

Fault tolerant systems such as Electro-Mechanical Aerospace & Automotive systems can employ dual lane architectures with dual-wound (or multi-lane) permanent magnet machines in order to improve availability. At the motor level, fault tolerance refers to the motor design limiting the short circuit fault current to rated value (e.g. 1.p.u). At the system level, fault tolerance refers to the systems increased availability during a single point failure, typically achieved by the use of dual or multi-channel architectures.

Figure 1:
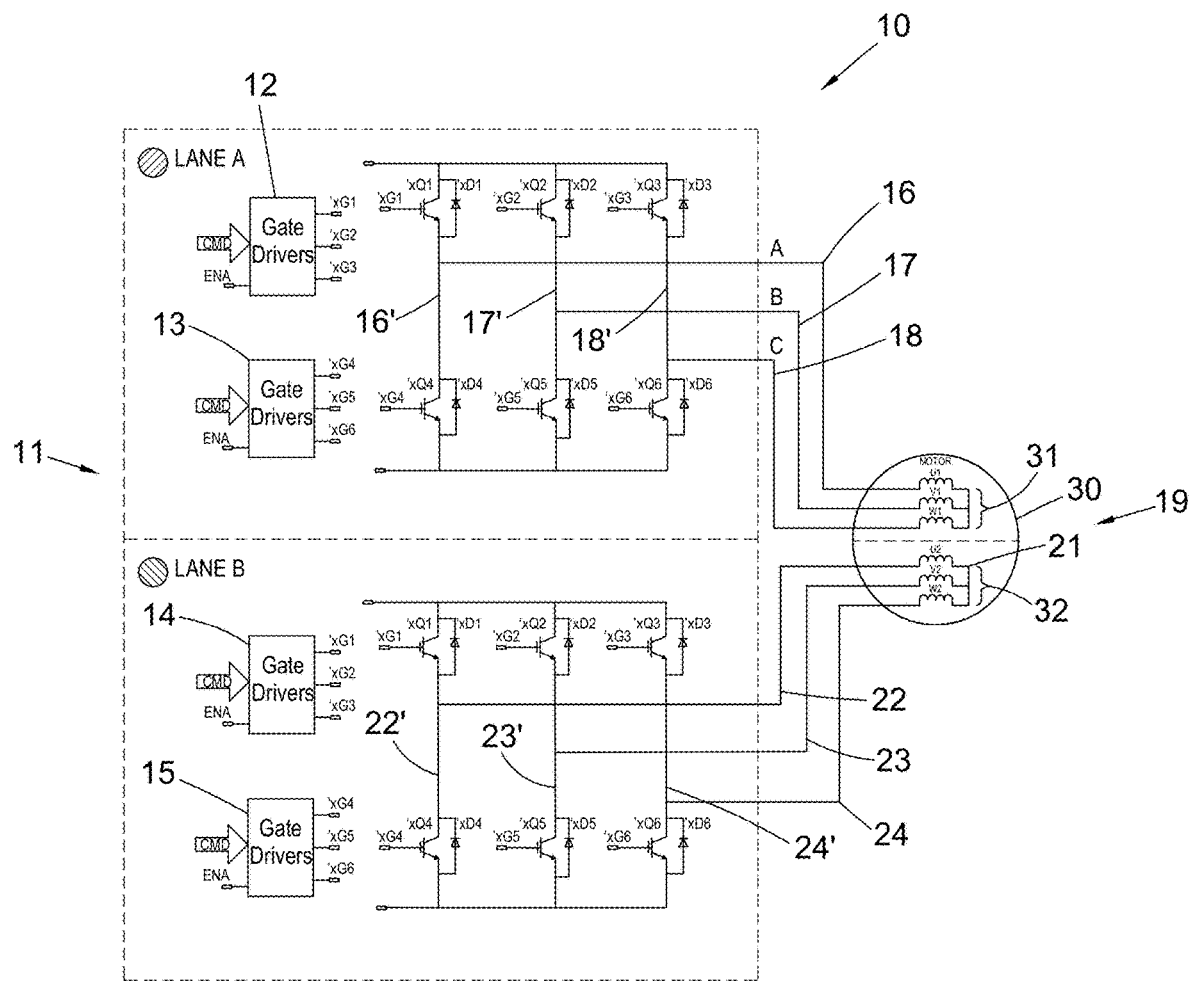
FIG. 1 shows the circuitry of a known Multi-Phase permanent magnet when in a healthy condition.

An example of a known system is shown in FIG. 1. The Multi-Phase motor in such architectures is designed to minimize short circuit current in the event of specific failure conditions in either lane. In such systems, however, failure of the inverter in one of the lanes of the dual lane architecture can result in significant drag torque on the healthy lane. Consequently, the motor and inverter of both lanes need to be dimensioned in such a way as to be able to deal with the load torque as well as this additional drag torque. This results in increase cost, weight and size.

FIG. 1 shows the circuitry 10 of a known Multi-Phase permanent magnet when it is running in a healthy condition. The circuitry comprises a first lane, A, and a second lane, B, both of which are electrically isolated from each other. The circuitry 10 is electrically connected at one end 11 to a power supply (not shown) and at the opposite end 19 to a permanent magnet motor (not shown) via a first winding group 31. The power supply supplies power to lane A via first and second gate drivers 12, 13. The gate drivers 12, 13 in turn are electrically connected to a plurality of inverter switches Qx (in this lane labelled as Q1 to Q6). Each of the inverter switches Q1 to Q6 are also electrically connected to a diode D1 to D6.

A first pair of the inverter switches Q1, Q4 (and associated diodes D1,D4) are electrically connected to each other via a phase 16' and to the permanent magnet motor 3 via a first phase 16 of a first winding group 31 of the permanent magnet motor 30. A second pair of the inverter switches Q2, Q5 (and associated diodes D2, D5) are also electrically connected to each other via a phase 17' and to a second phase 17 of the first winding group 31 of the permanent magnet motor 30. A third pair of the inverter switches Q3, Q6 (and associated diodes D3, D6) are also electrically connected to each other via a phase 18' and to a third phase 18 of the first winding group 31 of the permanent magnet motor 30.

Similar to lane A, the second lane, B is also electrically connected to the power supply by third and fourth gate drivers, 14, 15. The circuitry 10 is of this lane B is also electrically connected at one end 11 to a power supply (not shown) and at the opposite end 19 to a second winding group 32 of the permanent magnet motor (this second winding group 32, as well as the first winding group 31 being in this case a three-phase winding group, which consists of three windings) The power supply supplies power to lane B via third and fourth gate drivers 14, 15. The gate drivers 14, 15 in turn are electrically connected to a plurality of inverter switches Q1' to Q6'. Each of the inverter switches Q1' to Q6' are also electrically connected to a diode D1' to D6'.

As for lane A, in lane B, a first pair of the inverter switches Q1', Q4' (and associated diodes D1', D4') are electrically connected to each other via a phase 22' and to the permanent magnet motor 30 via a first phase 22 of a second winding group 32 of the permanent magnet motor 30. A second pair of the inverter switches Q2', Q5' (and associated diodes D2', D5') are also electrically connected to each other via a phase 23' and to a second phase 23 of the second winding group 32 of the permanent magnet motor 30. A third pair of the inverter switches Q3', Q6' (and associated diodes D3', D6') are also electrically connected to each other via a phase 24' and to a third phase 24' of the second winding group 32 of the permanent magnet motor 30.

As mentioned above, FIG. 1 shows a known system when it is running in a healthy condition. In this case, lane A is running in the active mode and lane B is running in the standby mode.

Figure 2:
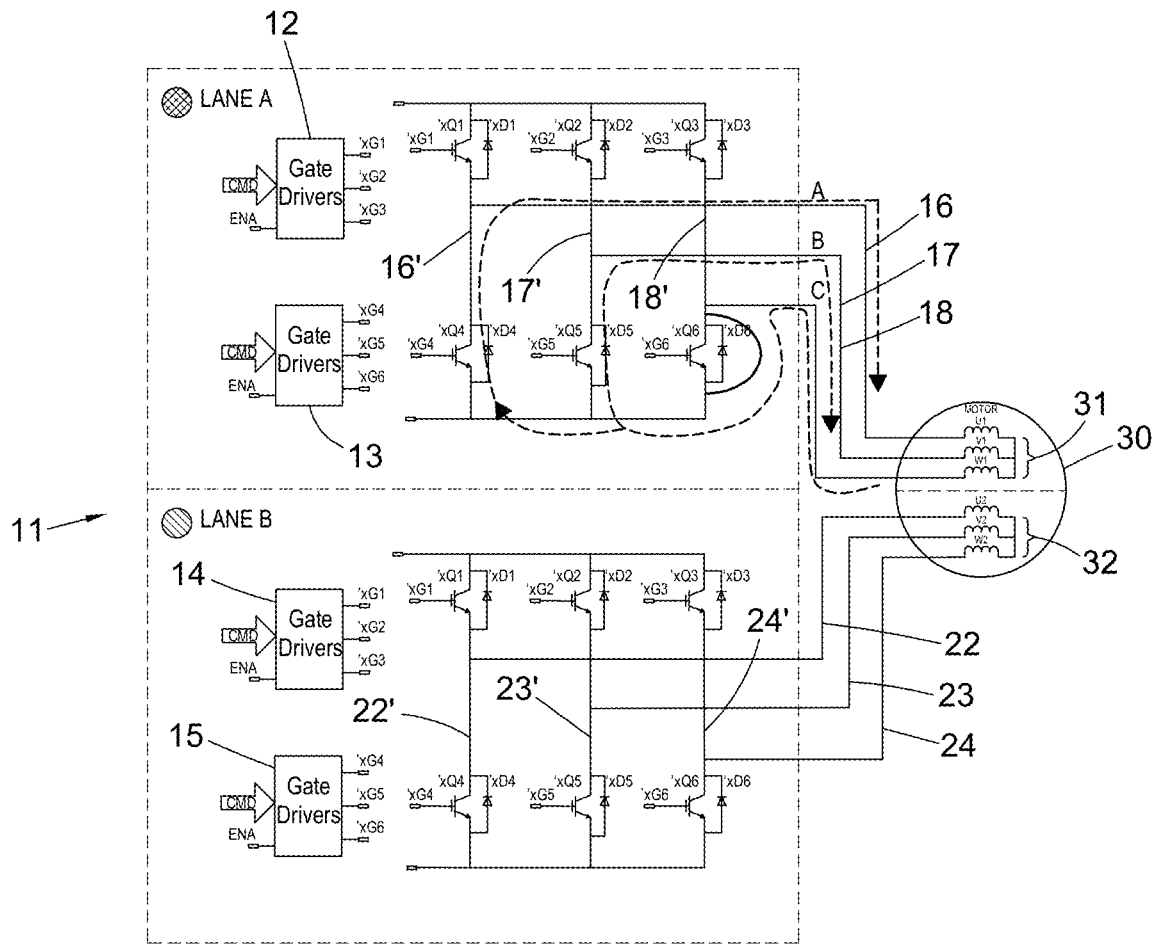
FIG. 2 shows the circuitry of a known Multi-Phase permanent magnet when in a fault condition.

FIG. 2 depicts the system of FIG. 1 wherein a fault has occurred in one of the inverter switches (Q6) of lane A. The same reference numerals represent the same features of FIG. 1. At t0, Lane A Inverter Q6 develops a Collector terminal Emitter terminal short circuit fault (C-E short cut fault).

As shown in FIG. 2, the current continues to flow in phases 16, 17, 18 during the t0-t1 interval until the fault is detected. Once the fault is detected, the faulty Lane A Inverter switches Q1 to Q6 are commanded by the controller to turn off. Since there is a fault at Q6, Q6 is no longer controllable, however, the remaining inverter switches Q1 o Q5 are still able to be controlled. The motor speed then begins to reduce towards zero. As can be seen in FIG. 2, a unidirectional current then flows in phase 18 (which was connected to the faulty inverter Q6), returning to phases 16 and 17 and through D4 and D5 respectively. This unidirectional current presents uncontrolled damping torque with high torque ripple. During this period, the potential for a plausible dual point failure exists due to the high phase currents present.

At time t2, Lane B is enabled and begins to drive phase current through the lane B motor phase winding group 32. The motor speed begins to increase if the phase 17 electromagnetic torque is greater than the load torque plus the Lane A motor phase winding group 31 drag torque. As the motor speed begins to rise, the phase current in lane A also rises, potentially beyond the maximum rating of the healthy switch/diode current ratings. At time t3, the drag torque resulting from the failure in lane A can be reduced by the controller commanding the lower side switches Q4, Q5, Q6 to turn ON (or higher side, Q1, Q2, Q3, dependent upon the fault location) at an optimum value of speed. However, a significant drag torque still remains following time t3, leaving significant power dissipation in Lane B motor and drive.

The examples described and shown below with reference to FIGS. 3 to 11 all relate to a new type of system for detecting and tolerating a fault in an electromechanical apparatus.

FIGS. 3 to 7 depict examples of a new system for detecting a fault in an electromechanical machine. Some of the features are the same as in the known devices and in those cases, the same description as provided above also applies for these examples. Where the features are the same, the same reference numerals have been used. In each of lanes A and B, six switches Q1-Q6 (each with an associated diode) are shown, however, the examples are not limited to this, and more, or less inverter switches may be used. For example, 3-level inverters may be used in some examples.

Figure 3:
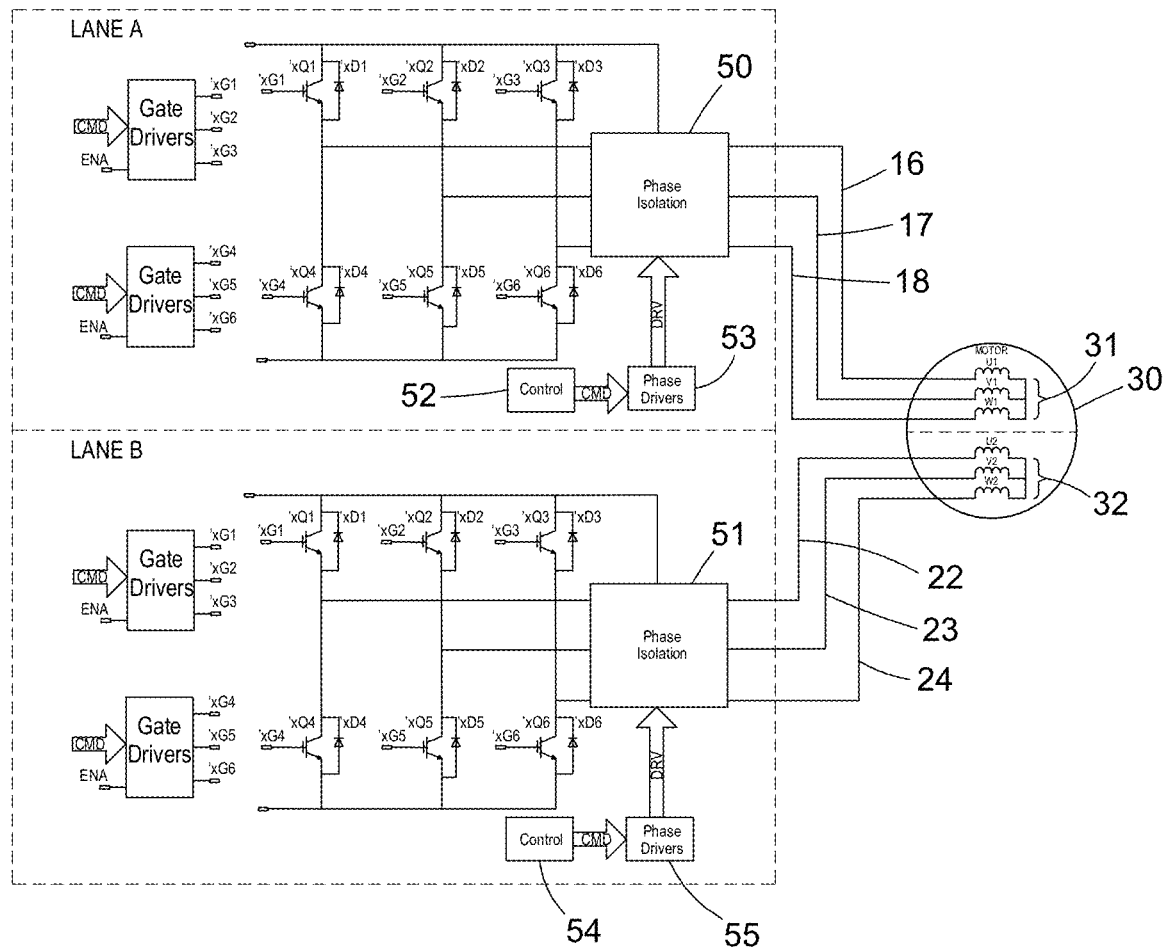
FIG. 3 depicts a new type of system as described herein for detecting a fault in an electromagnetic machine, wherein first and second phase isolation means are provided.

FIG. 3 depicts a new type of system for detecting a fault in an electromagnetic machine, in particular, a permanent magnet motor 30. As can be seen in this figure, a first phase isolation means 50 is provided at the output of lane A so that the three motor phases 16, 17, 18 pass through this phase isolation means 50 before reaching the motor 30 via the first winding group 31. A second phase isolation means 51 is also provided at the output of lane B so that the three motor phases 22, 23, 24 pass through this second phase isolation means 51 before reaching the motor 30 via the second winding group 32.

A first control means 52 is connected to the first phase isolation means 50 via a first phase driver(s) 53. A second control means 54 is connected to the second phase isolation means 51 via a second phase driver(s) 55. Each of the first and second phase isolation means 50, 51 may comprise a semiconductor switch 60, 61, 62 provided on each of the motor phases 16, 17, 18, 22, 23, 24. The semiconductor switches (Q7 to Q9 in lane A and Q7' to Q9' in lane B) may be provided at the phase output of each lane, i.e. between the inverter switches (and associated diodes) and the motor 30.

Figure 4:
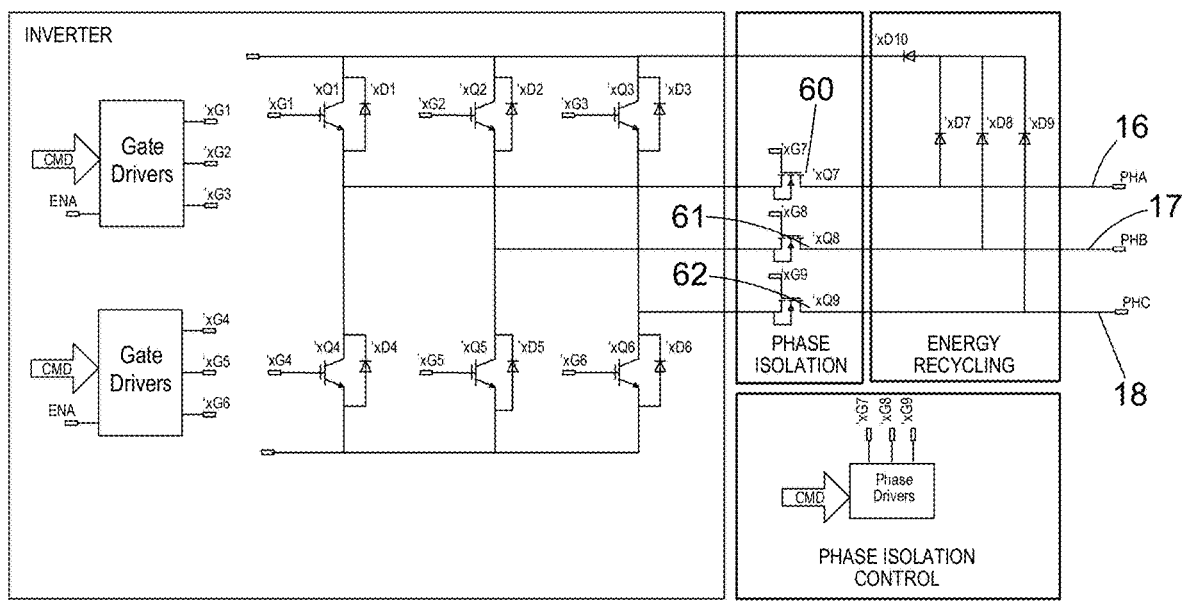
FIG. 4 shows an example of how phase isolation of lane A may be implemented.

FIG. 4, shows an example of how phase isolation of lane A may be implemented. Although FIG. 4 depicts only lane A, the same structure/features may be used for lane B. Each semiconductor switch Q7-Q9 and Q7'-Q9' is positioned in each of the motor phases 16 to 18 and 22 to 23. FIG. 4 depicts also an energy recycling function comprising diodes D7 to D10 which are provided so as to be connected to each of the motor phases 16, 17, 18, 22, 23 and 24. This energy recycling feature of the circuitry deal with the limitations experienced in present day switch technology avalanche energy capability.

Figure 5:
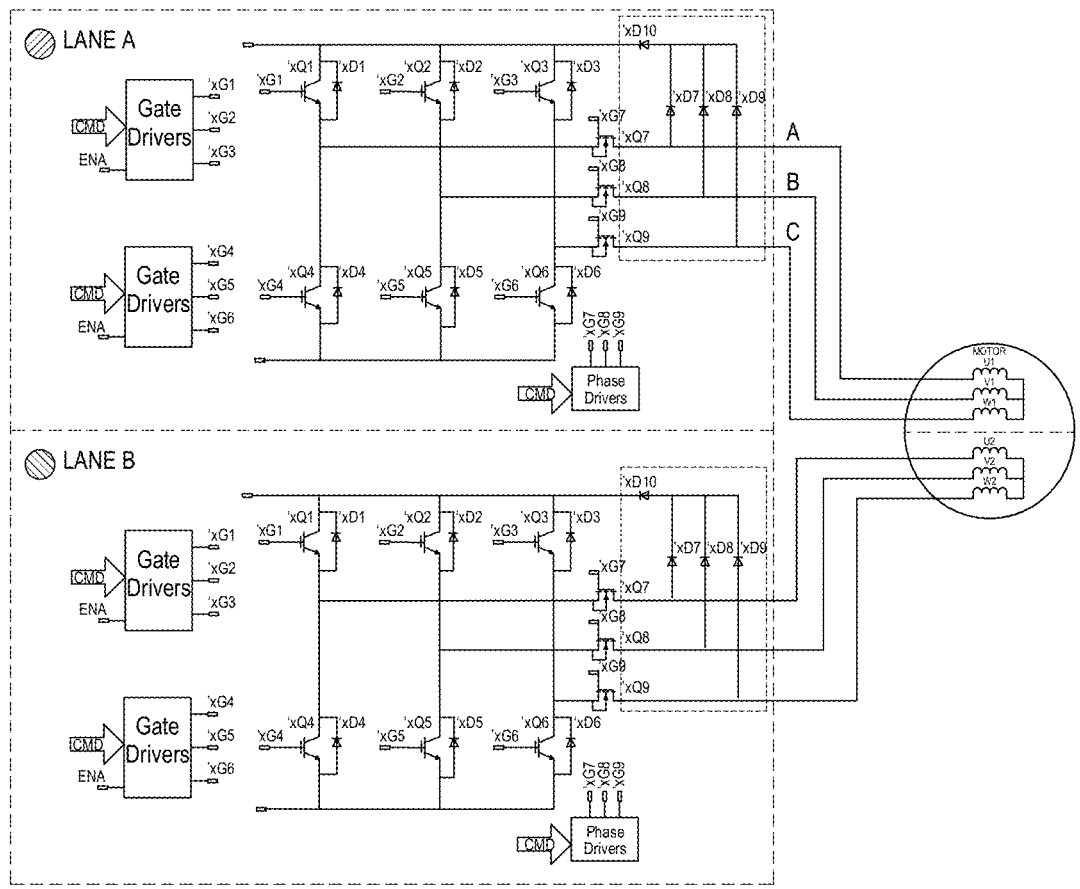
FIG. 5 depicts the new examples shown in FIGS. 3 and 4 in a healthy condition.

FIG. 5 depicts the new examples shown in FIGS. 3 and 4 in a healthy condition. In this example, lane A is in the active mode and land B is on standby mode.

Figure 6:
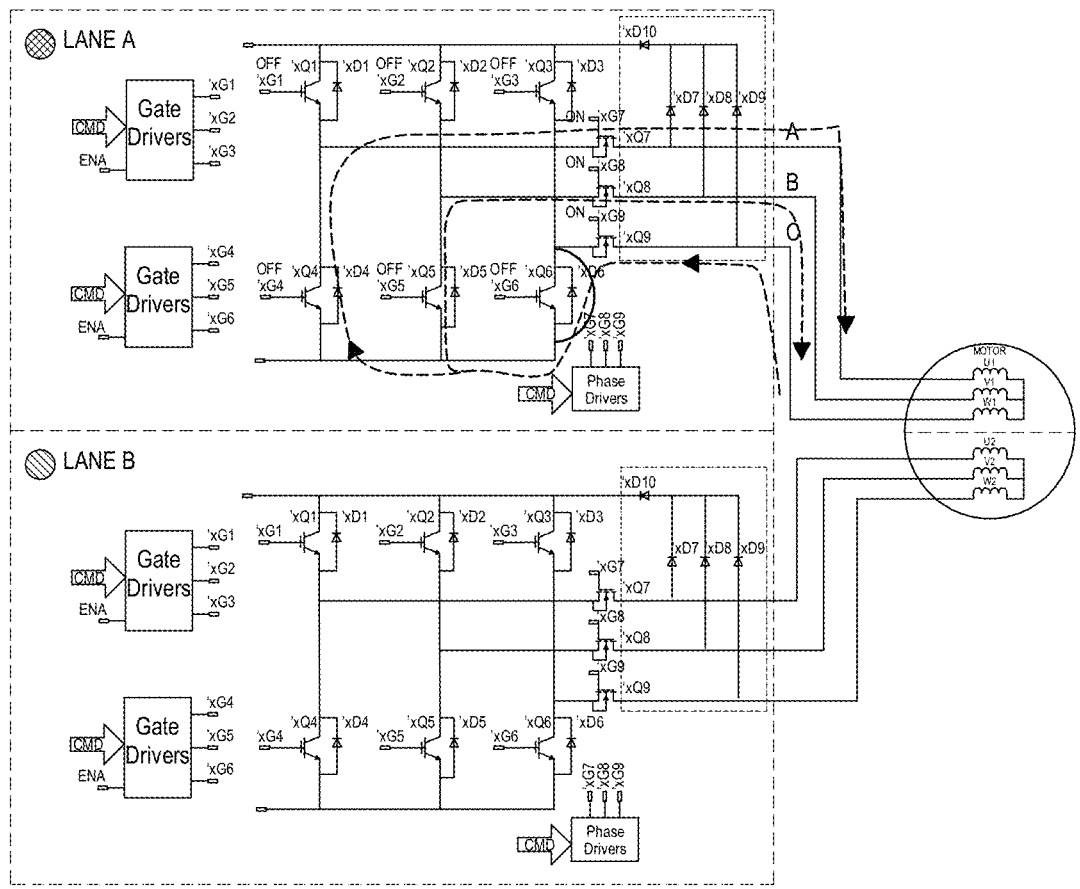
FIG. 6 depicts the system of FIG. 5 wherein the inverter Q6 of lane A has developed a C-E short circuit fault.

FIG. 6 depicts the system of FIG. 5 wherein at time t0 the inverter Q6 of lane A has developed a C-E short circuit fault. In this situation, the phase current in line A continues to flow in phases 16, 17 and 18 until the fault is detected. Such faults can be detected by a motor control means. The motor control means may comprise a microprocessor, a digital signal processor (DSP) or a Field Programmable Gate Array (FPGA). The phase current may be sensed by current sensors and then input to the motor control means. In this way, abnormal phase currents can be detected by the motor control means.

If the Q6 inverter switch overcurrent is detected, the motor control means sends a control signal to the inverter switch gate drivers, and the control signal commands the lane A inverter switches Q1 to Q6 to be disabled and switched off. The motor speed then begins to reduce to zero. Once the switch fault is detected at time t1 (switch pattern fault), the semiconductor switches Q7 to Q9 of the phase isolation means 50 of lane A are turned-off if the respective phase current is positive (i.e. flowing out of phase). A unidirectional current flows momentarily (i.e. for a portion of one electrical cycle) in phase 18, returning to phase 16 and 17 through D4 and D5 respectively and the intrinsic body diodes of Q7 and Q8. This unidirectional current presents damping torque for a portion of one electrical cycle.

At time t2, the phase 18 current magnitude is less than a predetermined threshold. Q9 is turned OFF and phase 18 current is diverted to D9, D10, a DC Link capacitor (not shown), D4 & D5 and back to phase 16 and 17 motor winding groups. Although the DC link capacitor is not shown, this may be located so as to be positioned across the inverter input supply terminals, i.e. Q1 collector/Q2 Emitter). A low threshold minimises current stress on recirculation diodes D7 to D10 and enables elimination entirely (depending on motor maximum speed and characteristics).

At time t3, motor phase currents decay to zero and consequently motor channel 16 damping torque is also zero.

Figure 7:
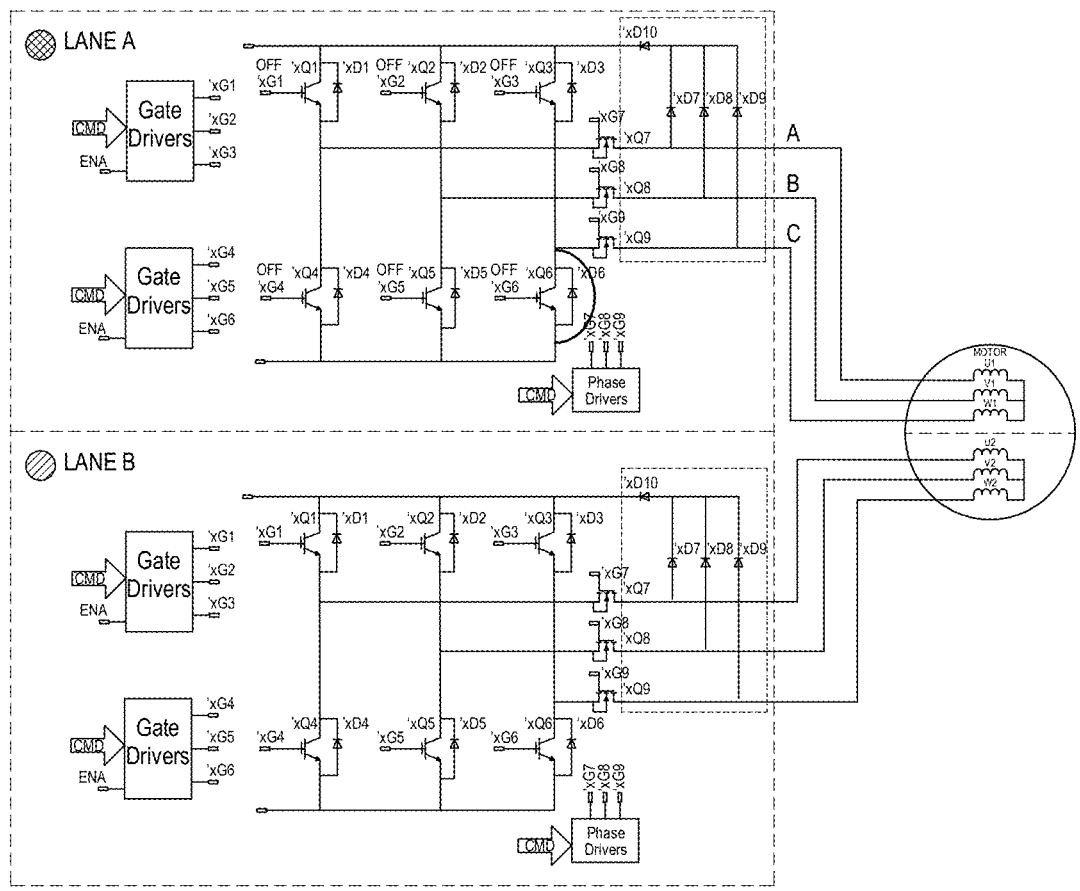
FIG. 7 shows the system of FIGS. 5 to 6 when the lane B inverter switches are enabled and made active.

As shown in FIG. 7, at time t4, lane B inverter switches are enabled and made active. This then supplies phase current to the motor channel 32 that is commensurate with the sum of the mechanical load+acceleration torque only (given that lane A damping torque is zero due to the current blocking action of the phase isolation switches Q7 to Q9). The phase switches Q7 to Q9 are controlled via an algorithm executed by the control means in such a way that they are configured to only turn off once the respective phase current magnitude is less than an arbitrary predetermined threshold. In some examples, the predetermined threshold may be more positive than −20 A, given the polarity of the phase isolation switches Q7, Q8, Q9, although the examples described herein are not limited to this. Unlike in the known systems such as those shown in FIGS. 1 and 2, the examples shown and described herein with reference to FIGS. 3 to 9 allow the motor speed to be relatively unchanged during the lane change period t0 to t4. This effect is shown in FIG. 8.

Figure 8:
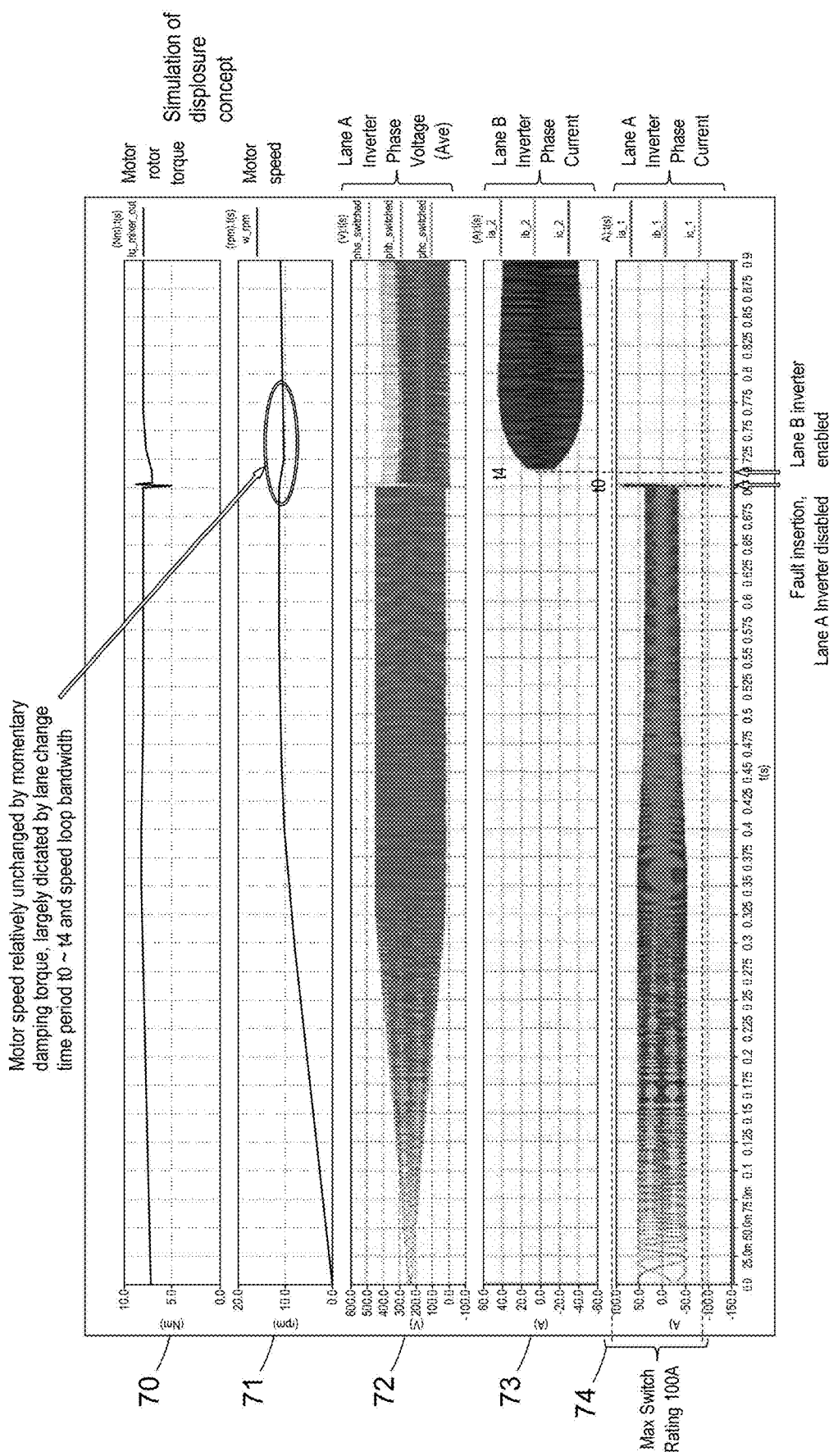
FIG. 8 depicts a series of graphs 70 to 74 showing the results of a simulation of the new examples described herein in use over time.

FIG. 8 depicts a series of graphs 70 to 74 showing the results of a simulation of the new examples described herein in use over time. The graph 70 depicts the motor rotor torque over time. The graph 71 depicts the motor speed over time. At point X, it can be seen that the motor speed is relatively unchanged by a momentary damping torque, largely dictated by the lane change time period from time t0 to t4 and the speed loop bandwidth. Graph 72 depicts the lane A inverter average phase voltages. Graph 73 depicts the lane B inverter phase currents. Graph 74 depicts the lane A inverter phase currents. It can also be seen in FIG. 5 the point at time t0 wherein due to the fault, the lane A inverter is disabled and at time t4 wherein lane B inverter is enabled.

Figure 9:
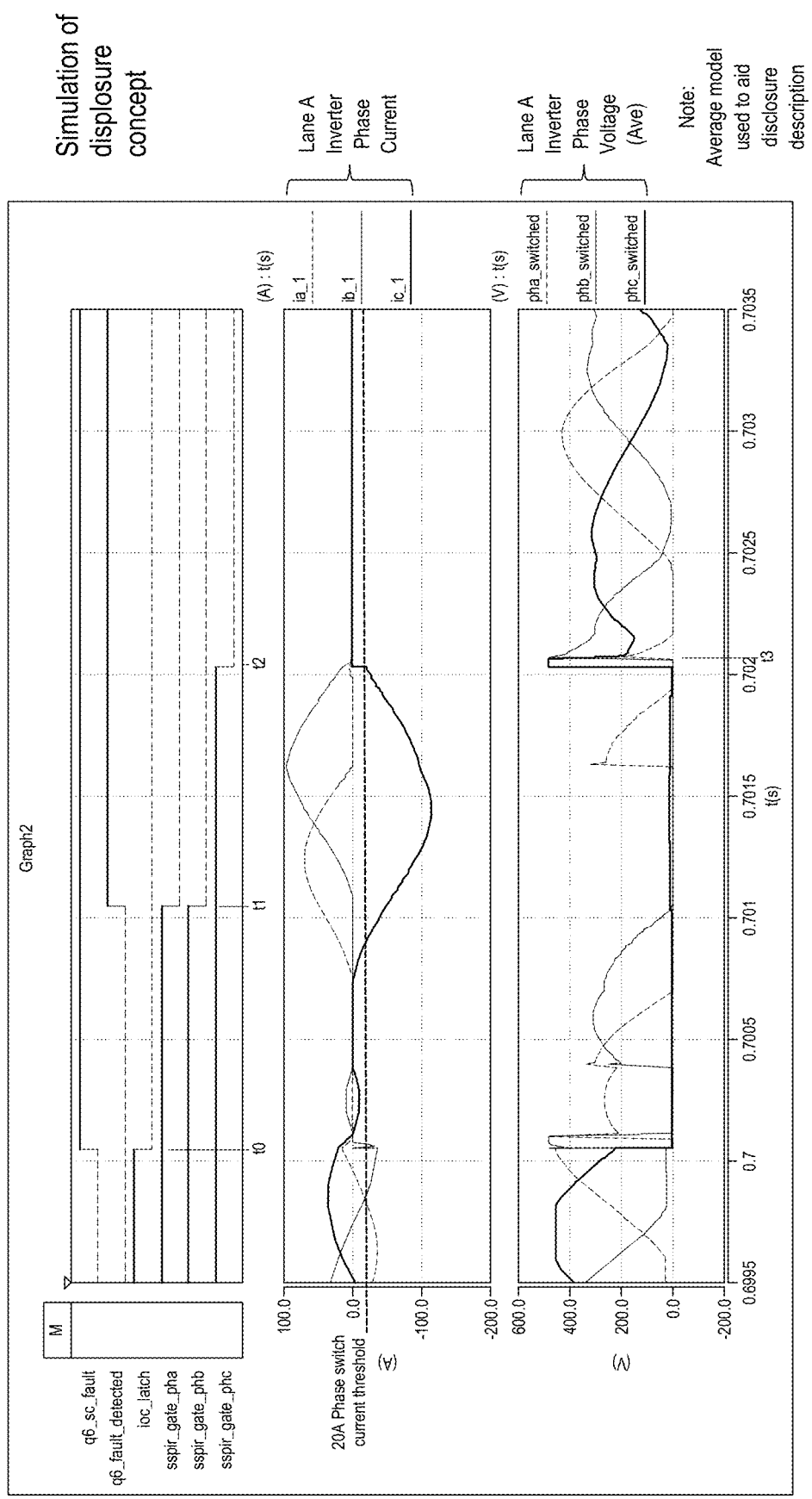
FIG. 9 illustrates the results of a simulation of the new examples.

FIG. 9 depicts graphs showing the lane A inverter phase currents in comparison to the lane A inverter voltages. This figure shows how the phase switches (Q7, Q8, Q9) algorithm is arranged such that they can only turn OFF once the respective phase current magnitude is more positive than a predetermined threshold (e.g. more positive than −20 A), given the polarity of the phase isolation switches Q7, Q8, Q9, although the examples described herein are not limited to this.

For example, referring to FIG. 9, the current in Phase A and Phase B (ia_1 and ib_1) is positive in direction (i.e. flowing out of the Inverter phase terminals, into the motor phase winding groups). Therefore ia_1 and ib_1 is >−20 A, which meets the criteria to immediately command Q7 and Q8 to switch OFF (sspir_gate_pha & sspir_gate_phb respectively). The intrinsic diodes of Q7 and Q8 (in conjunction with D4 and D5 respectively) ensure inductive energy in phase A and B motor windings is clamped to the Inverter 0V_Link.

However, the current in Phase C is negative in direction (i.e. flowing out of motor phase winding, into the Inverter phase terminal). The command to turn Q9 OFF (sspir_gate_phc) is only given after phase C current ic_1 has decreased in magnitude and is more positive than the arbitrary −20 A threshold. The remaining energy in Phase C motor winding is then recycled to the DC link supply via D9 and D10.

The examples described herein provide a secure means to prevent electromotive braking in permanent magnet motors during specific fault conditions. In particular they provide a means to mitigate electromotive braking in Multi-Phase permanent magnet motors, where one inverter channel has developed a fault.

When an inverter fault is detected, the circuitry is configured such that the remaining functional inverter switches of that lane are disabled and the three phase switches Q7, Q8, Q9 are turned off, thereby blocking the flow of electromotive force-generating current in any direction. This is because the channel of Q7 to Q9 Mosfets are now OFF, leaving the respective intrinsic diode as the only conductive path. However, since the net flow of phase current in a healthy three-phase motor must equal 0, the intrinsic diodes block the current loop in either direction.

Critically, the turn-off event is timed to occur when each phase current reaches the predetermined threshold or approaches zero. The motor control means may therefore be configured to govern this timing. The motor control means may be configured to sense the phase current and compare this against a threshold to determine actual turn OFF command signals to the phase isolation drivers. By doing so, it prevents destruction of the present technology phase switches during the turn-off event and may eliminate the need for additional protection devices for the phase switches.

The examples described herein also provide a means to prevent excessive inverter switch and motor phase current which may cause plausible dual point failures. They provide a means to prevent thermal damage and/or propagation of heat caused by excessive power loss in inverter and/or motor during specific fault conditions which may lead to common cause failures. They also provide a means to prevent significant stress on mechanical components connected to the motor output shaft, caused by very large torque ripple during specific fault conditions.

The examples described herein provide a secure means to prevent electromotive braking in permanent magnet motors during specific fault conditions. In particular, they provide a means to mitigate electromotive braking in Multi-Phase permanent magnet motors, where one inverter channel has developed a fault.

As described above, this is achieved by positioning a semiconductor switch in each of the motor phases. When an inverter fault is detected, the system is configured to disable the remaining functional inverter switches and is further configured to turn off the three phase switches. This therefore blocks the flow of electromotive force-generating current. The system is also configured to time the turn-off event so that it occurs when each phase current reaches or approaches zero, thus preventing destruction of the phase switches during the turn-off event.

The examples described herein result in a reduction of the input power draw from the aircraft electrical supply during specific inverter fault conditions and also provide an improved efficiency. The examples also eliminate the need to size the motor in order to overcome the drag torque for specific inverter fault conditions, which results in a cost and weight benefit. The need to increase the inverter switch current rating in dual lane architectures is also eliminated, thereby providing cost benefits. The examples described herein also provide a means to prevent plausible inverter dual point failures, thereby increasing reliability.

The invention claimed is:

1. A system for controlling an electrical current flowing between a power source and a multi-phase electromagnetic machine, wherein said system comprises:
    a first lane, A, comprising a first plurality of phases capable of providing said current from said power source to said machine;
    a second lane, B, comprising a second plurality of phases capable of providing said current to said machine,
    wherein system is configured to provide said current via said first lane, A, while no current is being provided via said second lane, B, and
    wherein each of said first plurality of phases comprises at least one inverter switch positioned between said power source and said machine;
    means for detecting a fault in one of the first plurality of inverter switches of lane A; and
    a first phase isolation means provided on said first lane, A;
    wherein, upon said detection of said fault in lane A, said system is configured to disable said inverter switches of lane A, and said first phase isolation means is configured to then block said current from flowing back from said machine and towards said faulty inverter of lane A.

2. The system of claim 1 wherein said first phase isolation means is positioned between said first plurality of inverters and said machine.

3. The system of claim 1 wherein each of said second plurality of phases of lane B comprises at least one inverter switch positioned between said power source and said machine.

4. The system of claim 3 further comprising:
    a second phase isolation means provided on said second lane, B, said second phase isolation means being positioned between said second plurality of inverters and said machine.

5. The system of claim 1, wherein, after said current is blocked by said first phase isolation means, said system is configured to enable said plurality of inverter switches provided on lane B so that said current flows from said power source to said machine via lane B and not via lane A.

6. The system of claim 1, wherein said first phase isolation means is configured to block said current when the current magnitude is less than a predetermined threshold.

7. The system of claim 6, wherein said threshold is more positive than −20 A.

8. The system of claim 1, wherein said first phase isolation means comprises a semiconductor switch and an associated diode.

9. A method for controlling the flow of an electrical current between a power source and a multi-phase electromagnetic machine, said method comprising:
providing a first lane, A, having a first plurality of phases and being capable of providing said current from said power source to said machine; and
providing at least one inverter switch positioned on each of said first plurality of phases and between said power source and said machine;
providing a second lane, B, comprising a second plurality of phases and being capable of providing said current to said machine;
electrically isolating said first and second lanes, A, B, from each other;
providing said current from said power source to said machine via said first lane A, while not providing a current is being provided via said second lane, B; and
providing a first phase isolation means on said first lane, A.

10. The method of claim 9, further comprising:
detecting a fault in one of the first plurality of inverter switches of lane A; and
upon said detection of said fault in lane A, disabling said inverter switches of lane A, and, via said phase isolation means, blocking said current from flowing back from said machine and towards said faulty inverter switch of lane A.

11. The method of claim 10, wherein said step of blocking said current is performed when the current magnitude is less than a predetermined threshold.

12. The method of claim 9, further comprising positioning said first phase isolation means between said first plurality of inverters and said machine.

13. The method of claim 9, further comprising positioning a second plurality of inverter switches on each of said second plurality of phases by positioning at least one inverter switch between said power source and said machine on each of said second plurality of phases of lane B.

14. The method of claim 13, further comprising providing a second phase isolation means on said second lane, B, by positioning a second phase isolation means between said second plurality of inverters and said machine.

15. The method of claim 14, further comprising, after said step of blocking said current via said first phase isolation means, enabling said second plurality of inverter switches provided on lane B so that said current flows from said power source to said machine via lane B and not via lane A.

* * * * *